United States Patent [19]

Taub

[11] Patent Number: 4,663,708
[45] Date of Patent: May 5, 1987

[54] SYNCHRONIZATION MECHANISM FOR A MULTIPROCESSING SYSTEM

[75] Inventor: Daniel M. Taub, Winchester, England

[73] Assignee: International Business Machines Corporation, Armonk, N.Y.

[21] Appl. No.: 628,176

[22] Filed: Jul. 6, 1984

[30] Foreign Application Priority Data

Jul. 8, 1983 [EP] European Pat. Off. ........ 83303985.2

[51] Int. Cl.$^4$ ............................ G06F 9/00; G06F 1/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,678,467 | 7/1972 | Nussbaum et al. | 364/200 |
| 3,761,884 | 9/1973 | Avsan et al. | 364/200 |
| 3,810,119 | 5/1974 | Zieve et al. | 364/200 |
| 3,943,494 | 3/1976 | Holmes, Jr. et al. | 364/200 |
| 4,333,144 | 6/1982 | Whiteside et al. | 364/200 |
| 4,369,494 | 1/1983 | Bienvenu et al. | 364/200 |
| 4,392,196 | 7/1983 | Glenn et al. | 364/200 |
| 4,493,053 | 1/1985 | Thompson | 364/900 |

Primary Examiner—Eddie P. Chan
Attorney, Agent, or Firm—Bradley A. Forrest

[57] ABSTRACT

A synchronization mechanism is disclosed for controlling devices or sub-systems connected to a common bus in a multiprocessing system so that the devices are kept in step one with the other when performing sequences of operations. More specifically, the mechanism ensures that no device can start its (i+1)th operation until all devices have completed their ith operation. This is achieved by providing each device with three synchronizing logic blocks (LB1, LB2, LB3) (LB', LB2', LB3') each of which functions to generate control signals (p, q, r respectively) on associated control lines at the end of selected operations in the sequence of operations. The control lines monitoring the performance of corresponding operations in all the devices are each applied via logic circuits (L1 or L2 or L3 as appropriate) (L1' or L2' or L3') to one of three selected bus lines (P, Q, R respectively). The logic circuits operate to produce a bus control signal on the selected bus line only when all of the corresponding operations have been completed by all the devices. As soon as a bus control signal is generated on one of the bus lines all devices start performing the next operation in the respective sequences.

6 Claims, 5 Drawing Figures

| BUS | LOGIC BLOCK 1 | | | LOGIC BLOCK 2 | | | LOGIC BLOCK 3 | | | ROW No. |
|---|---|---|---|---|---|---|---|---|---|---|
| P Q R | Start Q̄ R | Q̄ P | P② | P R̄ | Q R̄ | Q③ | P̄ Q | P̄ R | R① | |
| 0 0 1 | 0 1 1 <br> 0 | 1 0 <br> 0 <br> 0 | 0 | 0 0 <br> 0 | 0 0 <br> 0 <br> 0 | 0 | 1 0 <br> 0 | 1 1 <br> 1 <br> 1 | 0 | 1 <br> 2 <br> 3 |
| Start → | 1 1 1 <br> 1 | 1 0 <br> 0 <br> 1 | 0 | 0 0 <br> 0 | 0 0 <br> 0 <br> 0 | 0 | 1 0 <br> 0 | 1 1 <br> 1 <br> 1 | 0 | 4 <br> 5 <br> 6 |
| 1 0 1 | 1 1 1 <br> 1 | 1 1 <br> 1 <br> 1 | 0 | 1 0 <br> 0 | 0 0 <br> 0 <br> 0 | 0 | 0 0 <br> 0 | 0 1 <br> 0 <br> 1 (Op1end) | 1 | 7 <br> 8 <br> 9 |
| | 1 1 1 <br> 1 | 1 1 <br> 1 <br> 1 | 0 | 1 0 <br> 0 | 0 0 <br> 0 <br> 0 | 0 | 0 0 <br> 0 | 0 1 <br> 0 <br> 0 | 0 | 10 <br> 11 <br> 12 |
| 1 0 0 | 0 1 0 <br> 0 | 1 1 <br> 1 <br> 1 | 0 | 1 1 <br> 1 | 0 1 <br> 0 <br> 1 | 0 | 0 0 <br> 0 | 0 0 <br> 0 <br> 0 | 0 | 13 <br> 14 <br> 15 |
| 1 1 0 | 0 0 0 <br> 0 | 0 1 <br> 0 <br> 1 (Op 2end) | 1 | 1 1 <br> 1 | 1 1 <br> 1 <br> 1 | 0 | 0 1 <br> 0 | 0 0 <br> 0 <br> 0 | 0 | 16 <br> 17 <br> 18 |
| | 0 0 0 <br> 0 | 0 1 <br> 0 <br> 0 | 0 | 1 1 <br> 1 | 1 1 <br> 1 <br> 1 | 0 | 0 1 <br> 0 | 0 0 <br> 0 <br> 0 | 0 | 19 <br> 20 <br> 21 |
| 0 1 0 | 0 0 0 <br> 0 | 0 0 <br> 0 <br> 0 | 0 | 0 1 <br> 0 | 1 1 <br> 1 <br> 1 | 0 | 1 1 <br> 1 | 1 0 <br> 0 <br> 1 | 0 | 22 <br> 23 <br> 24 |
| 0 1 1 | 0 0 1 <br> 0 | 0 0 <br> 0 <br> 0 | 0 | 0 0 <br> 0 | 1 0 <br> 0 <br> 1 (Op3end) | 1 | 1 1 <br> 1 | 1 1 <br> 1 <br> 1 | 0 | 25 <br> 26 <br> 27 |
| | 0 0 1 <br> 0 | 0 0 <br> 0 <br> 0 | 0 | 0 0 <br> 0 | 1 0 <br> 0 <br> 0 | 0 | 1 1 <br> 1 | 1 1 <br> 1 <br> 1 | 0 | 28 <br> 29 <br> 30 |
| 0 0 1 | etc <br> p | | | etc <br> q | | | etc <br> r | | | |

| ROW | RUN | BUS LINES | | | OUTPUTS | | | FLIP-FLOP EXCITATION SIGNALS | | | | | | NEXT STATE | | |
|---|---|---|---|---|---|---|---|---|---|---|---|---|---|---|---|---|
| | | P | Q | R | Do Op1 | Do Op2 | Do Op3 | $set_p$ | $rst_p$ | $set_q$ | $rst_q$ | $set_r$ | $rst_r$ | p | q | r |
| 1 | 0 | 0 | 0 | 1 | 0 | 0 | 0 | 0 | X | 0 | X | 1 | 0 | 0 | 0 | 1 |
| 2a | 1 | 0 | 0 | 1 | 0 | 0 | 0 | 1 | 0 | 0 | X | 1 | 0 | 1 | 0 | 1 |
| 2b | 0 | 1 | 0 | 1 | 0 | 0 | 0 | 1 | 0 | 0 | X | 1 | 0 | 1 | 0 | 1 |
| 3 | X | 1 | 0 | 1 | 1 | 0 | 0 | 1 | 0 | 0 | X | 1 | 0 | 1 | 0 | 1 |
| 4 | X | 1 | 0 | 1 | 1 | 0 | 0 | 1 | 0 | 0 | X | 0 | 1 | 1 | 0 | 0 |
| 5 | X | 1 | 1 | 0 | 0 | 1 | 0 | 0 | 0 | 1 | 0 | 0 | X | 1 | 1 | 0 |
| 6 | X | 1 | 1 | 0 | 0 | 1 | 0 | 0 | 0 | 1 | 0 | 0 | X | 1 | 1 | 0 |
| 7 | X | 1 | 1 | 0 | 0 | 0 | 1 | 0 | 0 | 1 | 0 | 0 | X | 0 | 1 | 0 |
| 8 | X | 0 | 1 | 0 | 0 | 0 | 1 | 0 | 1 | 0 | 0 | 1 | 0 | 0 | 1 | 1 |
| 9 | X | 0 | 1 | 1 | 0 | 0 | 0 | 0 | X | 0 | 0 | 1 | 0 | 0 | 1 | 1 |
| 10 | X | 0 | 1 | 1 | 0 | 0 | 0 | 0 | X | 0 | 1 | 1 | 0 | 0 | 0 | 1 |
| 11 | 1 | 0 | 0 | 1 | 0 | 0 | 0 | 1 | 0 | 0 | X | 1 | 0 | 1 | 0 | 1 |

FIG. 5

SYNCHRONIZATION MECHANISM FOR A MULTIPROCESSING SYSTEM

FIELD OF INVENTION

The invention relates to a multiprocessing system of the type in which a plurality of devices or sub-systems are interconnected via a bus. Each device or sub-system is operable to perform sequences of operations and it is an essential requirement of the system that the the devices are kept strictly in step with each other during performance of sequences of operations. That is, no device or sub-system connected to the bus may start its (i +1)th operation in a sequence until all devices have completed their ith operation.

PRIOR ART

The conventional way of satisfying this requirement is to apply a common clock waveform to all the devices. There are however, disadvantages to this approach. For example, operations performed by the various devices or sub-systems may take different lengths of time because of their varying complexity or because the circuits operate at different speeds, possibly due to the use of different circuit technologies. If such devices are controlled by a clock waveform, then the clock frequency must be low enough to accommodate the slowest operation. Moreover, if the operations or the device speeds change from time to time, the clock may have to be slowed down to maintain correct operation, or speeded up in order to take advantage of any speed increase.

An example in data processing where a sequence of operations performed by different devices are kept in step using a clock is to be found in bit slice processors such as described in the test book Digital System Design with LSI Bit Slice Logic by G. J. Myers 1980.

Another example where several devices on a bus are kept in synchronism by means of a clock is the Intel MULTIBUS 11 as described in Intel Multibus II Bus Architecture Specification Handbook 1983.

SUMMARY OF INVENTION

Synchronization of device operation as required by the system, in accordance with the present invention, is achieved by arranging for the start of every new operation in a sequence to be triggered by whichever device was the last to complete the previous operation in its sequence. The requirement is achieved by means of simple logic circuits which lend themselves readily to manufacture using present day integrated circuit techniques.

BRIEF DESCRIPTION OF DRAWINGS

In order that the invention may be fully understood, preferred embodiment thereof will now be described with reference to and as illustrated in the accompanying drawings. In the drawings.

DESCRIPTION OF THE PREFERRED EMBODIMENTS

Multiprocessing systems to which this invention is applicable include a common bus interconnecting several devices or sub-systems operating for example under control of an arbitration scheme which determines the priority of devices wishing to communicate with other devices on the bus. Generally such arbitration schemes involve several procedures for dealing with competition between devices seeking control of the bus and for transferring control from one device to another. All procedures however have one feature in common in that they require all devices connected to the bus to carry out a sequence of operations which have to be kept strictly in synchronism. It is to this requirement that the present invention is directed.

The implementation of the invention to be described requires three output control lines from each device to be connected respectively one to each of three bus lines forming part of the common bus interconnecting all the devices. In operation, each device generates three binary variables, or output control signals, p, q and r one on each of the three output control lines from the device. The control signals represent the current operating state of the device from which they are "OR'ed" supplied. The three output control lines from each device are to the corresponding bus lines. Thus, one bus line carries the OR-function of the variable p in all the devices, (this will be referred to hereinafter as the P bus line) another bus line (the Q bus line) carries the OR-function of the variable q in all the devices and the remaining bus line (the R bus line) carries the OR-function of the variable r in all the devices.

Figure 1:
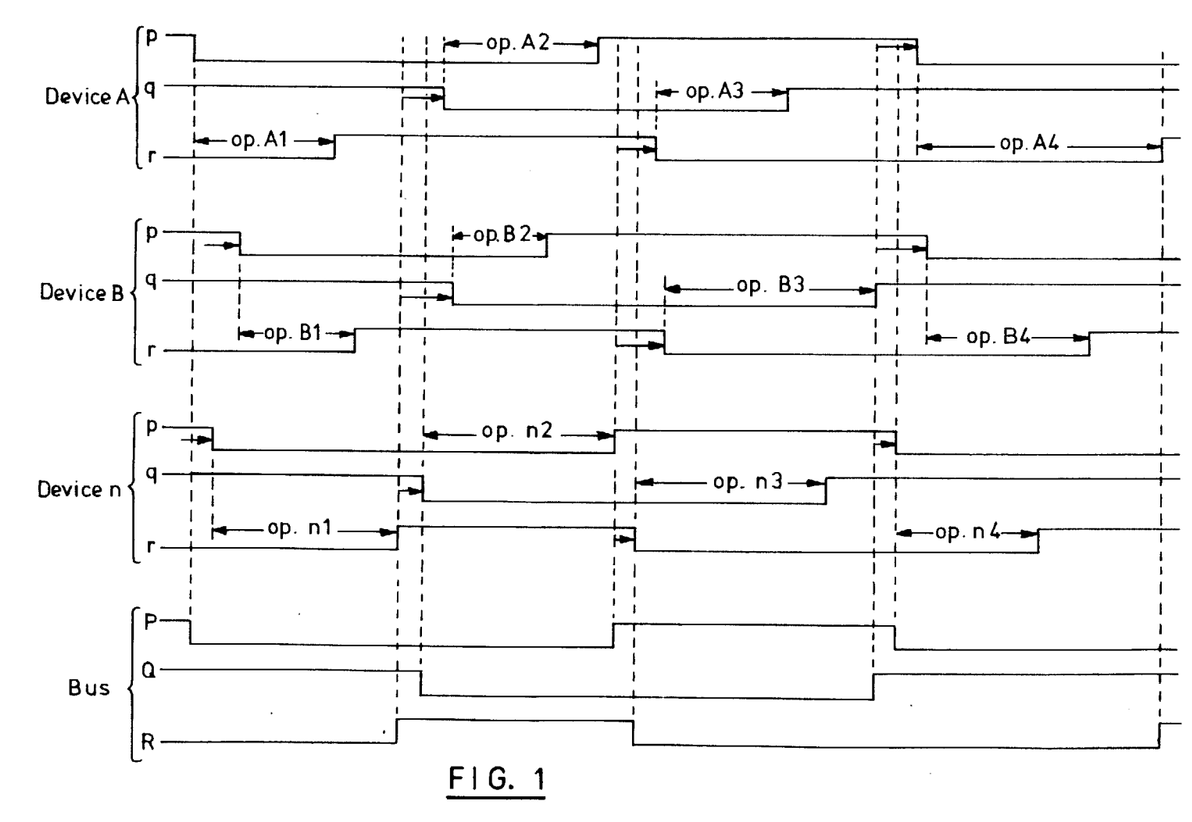
FIG. 1 shows the control waveforms generated by synchronising control logic associated with each device and operating in accordance with the present invention.

The way in which the variables and line states change as the sequence of operations are performed by the devices is illustrated in FIG. 1. In all waveforms, binary '1' is represented by the less-positive value.

In the upper part of the figure, the changing waveforms of the control signals p, q and r are shown during the performance by each device of four consecutive operations in a sequence of operations. In the lower part of the figure, the changing waveforms of the resulting bus signals P, Q and R generated by the logical OR-ing of the corresponding p, q and r variables from these three devices respectively are shown. It will be appreciated that in practice the states of the P, Q and R signals on the bus lines are derived from the logical OR-ing of the corresponding signals on the p, q and r lines from all the devices, but for the purposes of illustration, the generation of these signals from only three devices is adequate. The changing signal states of the P, Q and R bus lines are themselves monitored by all the devices connected to the bus by input control lines and used to control the devices to perform their operations in step as required. Details of the actual circuit arrangements of the synchronising logic producing these control signals will be described hereinafter with reference to FIG. 2 of the drawings.

Initially, as shown in FIG. 1, with no device on the bus performing an operation, the p, q and r signals in every device, and therefore the P, Q and R signals on the bus have the binary values 0, 0, 1 respectively. The bus values thus correspond to the individual p, q and r values of each device and so the system is stable. A sequence of operations is started by forcing the variable p of a selected device to a binary '1' state. In the example chosen to illustrate the present invention Device A has been selected to start. The sequence of events is as follows:

1. An external START signal switches the p variable of Device A to binary '1'. Since the p lines from all the devices are connected to the P bus-line via wired-OR logic, the binary state of the p line signal from Device A causes the P bus line to be switched to a binary '1'. Device A starts its first operation (op A1). This change of state of the P bus line signal to binary '1', is detected by all remaining devices which respond by switching their own p lines to binary '1' and starting their own respective first operations (op B1 . . . op. n1). The p, q and r outputs from all the devices have the values 1, 0, 1, respectively which corresponds to the P, Q and R bus values and so the system is once again stable. The time delay shown in the waveforms from the switching of the P bus line to the subsequently induced switching of the device p lines is a function of device speed and line propagation time and can vary from device to device.

2. As each device completes its first operation, it responds by switching its own r line signal to binary '0'. The internal signal causing this to happen will be generated by the circuit controlling the operation in question. From the figure it is seen that the various first operations (op. A1; op. B1 etc.) consume different lengths of time. The OR-function connection between the r lines of the device and the R bus line holds the level of the R bus signal constant until the last device (in this case Device n) completes its first operation, whereupon the R bus signal switches state to a binary '0'.

3. The change of state of the R bus line signal to binary 0 is detected by all the devices which respond by switching their own q lines to binary '1' and starting their own respective second operations (op. A2; op. B2; . . . op. n2). Again the time taken to switch the individual q lines varies from device to device and the various second operations consume different lengths of time. The OR function connection between the q lines of the devices and the Q bus line forces the Q bus-line to a binary '1' state as soon as the first q line from a device (in this case Device n) goes to a binary '1'. The p, q and r outputs from all the devices now have the values 1, 1, 0 which correspond to the P, Q and R bus values and the system is once again stable.

4. As each device completes its second operation, it responds by switching its own p line signal to a binary '0'. Only when the last device (in this case device n) has done so will the P bus line be switched to binary '0'.

5. The change of state of the P bus line signal to binary '0' is detected by all the devices which respond by switching their own r lines to binary '1' and starting their respective third operations (op A3; op B3; . . . op n3). The time taken to switch the individual lines varies from device to device and the time to complete the various third operations differs from device to device for the reasons given hereinbefore. The OR function connection between the r lines of the devices ensures that the R bus line changes state to a binary '1' as soon as the first r line from a device (in this case device n) goes to a binary '1' state. The p, q and r outputs from all the devices now have the values 0, 1, 1 which correspond to the P, Q and R bus values and the system is once again stable.

6. As each device completes its third operation, it responds by switching its own q line to binary '0'. Only when the last device (in this case device B) has done so will the Q bus line be switched to a binary '0'. It will be observed that the system is once more in the state immediately following the forced start of Device A and the same process is repeated as the devices perform subsequent operations.

7. Thus, as before, the change in state of the Q bus line signal to a binary '0' is detected by all devices which respond by switching their own p lines to binary '1' and starting their fourth operations (op A4; op B4; . . . op n4). The wired-OR connections to the bus causes the P bus line to switch to a binary '1' state as soon as the first p line from a device (in this case, Device n) switches to a binary '1'. The fourth operations performed by the devices are timed on their respective r lines as before and the last one to finish (in this case device A) switches the R bus line to a binary '1' state. The fifth operation may now be started by the devices.

The process continues in this manner until the complete sequence of operations is finished. In practice, the operations can be counted independently in the various devices, or alternatively by one of the devices which indicates a count value on additional lines in the bus. If the number of operations in the sequence performed by each device is an integral multiple of 3, then the p, q and r control signals will finish with values 0, 0, 1 respectively, that is, the values at which they started. If not, dummy operations can be added at the end of the sequence to bring the devices back to the correct initial states.

The synchronizing logic provided in each device connected to the bus will now be described as the first embodiment of the invention with reference to FIG. 2. The three bus lines P, Q and R forming part of a multiline bus to which all the devices are connected and shown to the left-hand of a chain-dotted notional boundary line. The control logic from one device is shown to the right-hand of this boundary. The p, q and r input and output control lines to and from the control logic are shown connected respectively to P, Q and R bus lines by wired OR-logic connections L1, L2 and L3 shown symbolically in the figure. These connections L1, L2 and L3 are provided in a well known manner through conventional open-collector transistor stages.

The control logic for each device (such as Device A, Device B . . . Device n) can conveniently be regarded as consisting of three separate logic blocks LB1, LB2, and LB3 each consisting of a logical combination of an inventer, two AND-gates and an OR-gate. In order to be able to refer to the individual components in the three logic blocks without confusion, those in logic block LB1 are identified by the numerals 1, 2, 3, and 4; the corresponding components in logic block LB2 by the numeral 11, 12, 13, and 14; and the corresponding components in logic block LB3 by the numerals 21, 22, 23, and 24.

The three bus lines P, Q, and R are all connected as input conductors (control lines) to each of the three logic blocks LB1, LB2 and LB3 of the device. The output from logic block LB1 is the p signal for the device; the output from logic block LB2 is the q signal for the devices; and the output from the logic block LB3 is the r signal for the device.

In addition to the P, Q and R bus inputs, two further input lines are supplied to logic block LB1. One of these, the START line, is used to force a start should its associated device be the one selected to commence the sequence of operations. The other carries a signal indicating by its binary state whether or not the second operation (or indeed the 5th, 8th, 11th etc.) is currently in progress. This signal (Op. 2 in progress) is derived directly from the q signal from the device. Logic block LB2 has a further input conductor indicating by its binary state whether or not the third operation (or indeed the 6th, 9th, 12th etc) is currently in progress. This signal (Op. 3 in progress) is derived directly from the r signal from the device. Finally, logic block LB3 has a further input conductor indicating whether or not the first operation (or indeed the 4th, 7th, 10th etc.) is currently in progress. The signal (Op. 1 in progress) is derived directly from the p signal of the device.

Figure 2:
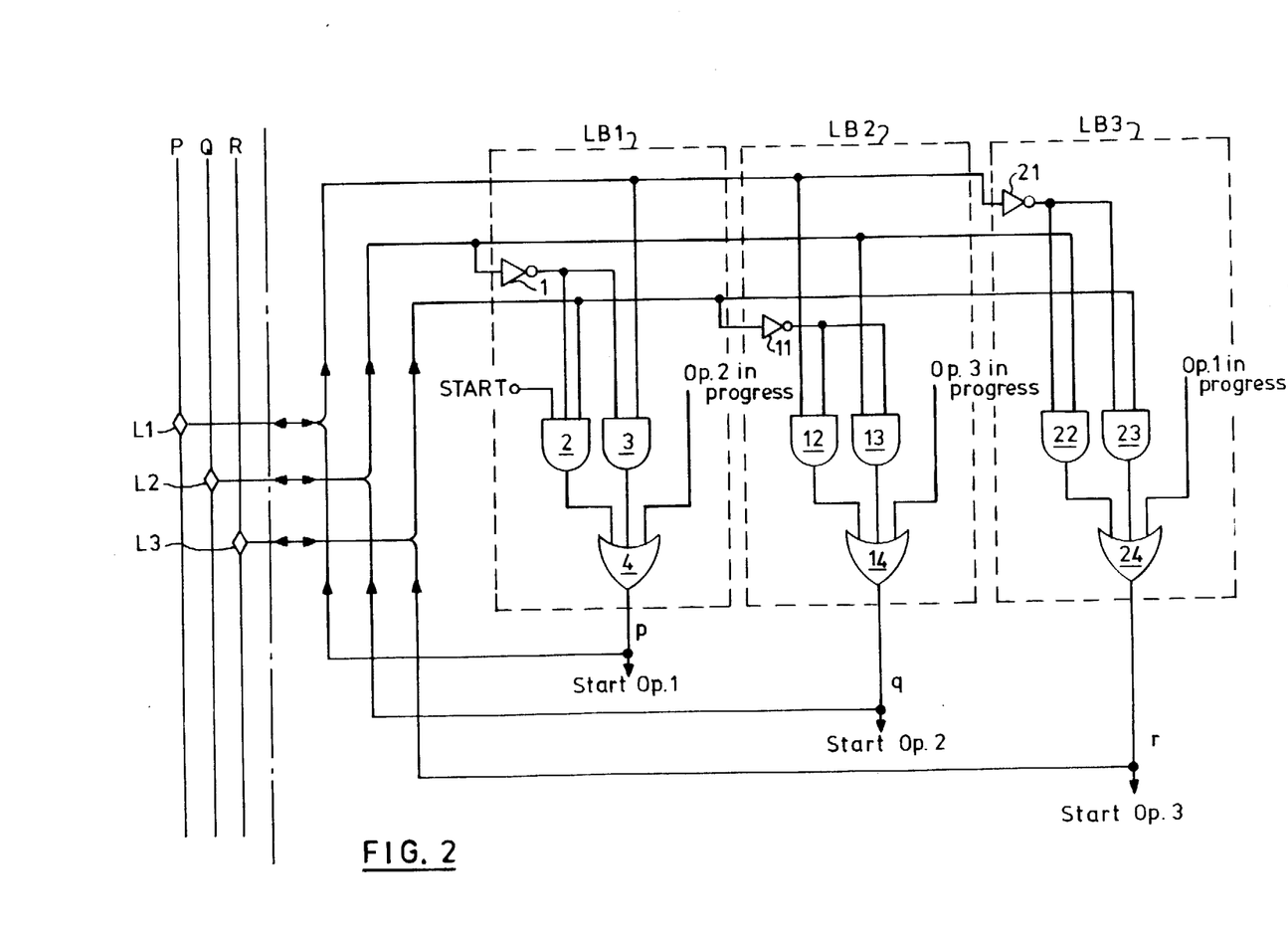
FIG. 2 shows details of the synchronizing logic associated with each device according to a first embodiment of the invention, operable to generate the control waveforms shown in FIG. 1.
Figure 3:
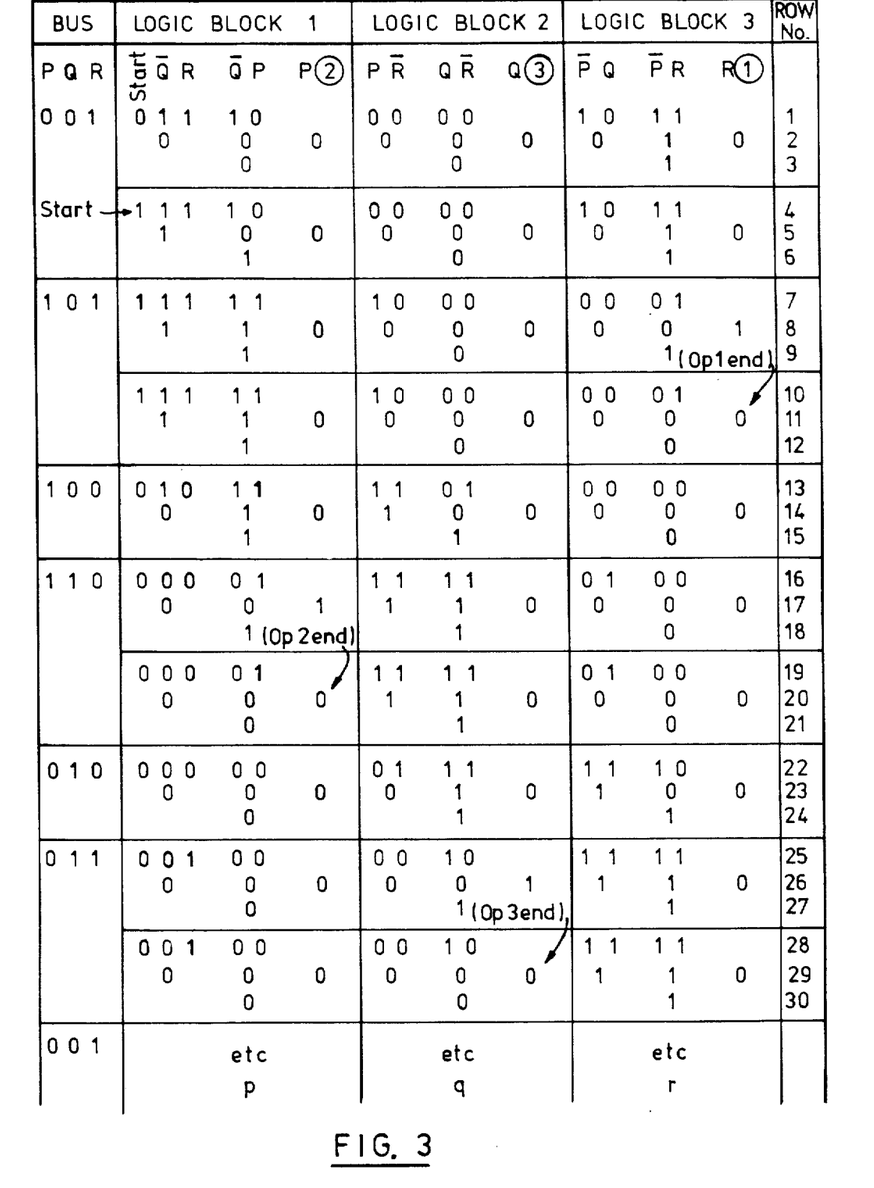
FIG. 3 is a state table for the synchronizing logic shown in FIG. 2.

The operation of the control logic shown in FIG. 2 is set out in the logic state table shown in FIG. 3. In this figure, the changing signal binary values on the bus lines P, Q and R are shown in the left-hand column. The input conditions applied to the various logic components of the three logic blocks of each device are shown in the three major columns headed LOGIC BLOCK 1, LOGIC BLOCK 2 and LOGIC BLOCK 3 respectively. Thus, as indicated in this figure and as may be ascertained by inspection of the circuit shown in FIG. 2, the logic inputs to the three logic blocks are as follows:

LOGIC BLOCK 1

AND—gate 2—input START.$\bar{Q}$ R
AND—gate 3—input $\bar{Q}$ P
OR—gate 4—input (AND—gate 2 output) +(AND—gate 3 output) +(Op. 2 in progress)
NOTE (Op. 2 in progress) is represented by an encircled 2 in the state table.

LOGIC BLOCK 2

AND—gate 12—input P. $\bar{R}$
AND—gate 13—input Q. $\bar{R}$
OR—gate 14—input (AND—gate 12 output) +(AND—gate 13 output) +(Op. 3 in progress)
NOTE (Op.3 in progress) is represented by an encircled 3 in the state table.

LOGIC BLOCK 3

AND—gate 22—input $\bar{P}$ Q
AND—gate 23—input $\bar{P}$ R
OR—gate 24—input (AND gate 22 output) +(AND—gate 23 output) +(Op. 1 in progress)
NOTE (Op. 1 in progress) is represented by an encircled 1 in the state table.

In the initial state with no device on the bus performing an operation, the P, Q and R signal values are 0, 0, 1 respectively. This results in the input conditions, as shown in Row No 1 of the state table, applied to the AND-gates of the three logic blocks. The outputs from the AND-gates, and thus the inputs to the associated OR-gates, are shown in Row No 2, and the outputs from the OR-gates and thus the associated logic blocks in Row No 3.

Raising the signal level on the START input to AND-gate 2 indicated by the arrow labelled START in Row No 4 results in AND-gate 2 and OR-gate 4 being enabled and the p signal switching to a binary '1' state. This signal is applied through wired-OR logic L1 to the P bus line which changes its state to signal to all other devices to start operation 1 and further supplied to the associative device to cause it to start its own operation 1. The P signal is also applied as input to AND-gate 3 maintaining the P output from logic blocks LB1 in a binary '1' state. The (Op 1 in progress) signal to OR-gate 24 of Logic Block 3 is raised as a consequence as shown in Row No 8 of the state table, OR-gate 24 continues to be enabled and the r signal of the device remains at the binary '1' state.

This stable condition prevails until such time as the first operation is finished, indicated by the dropping of the (Op. 1 in progress) signal level applied to OR-gate 24. This occurrence is indicated in the state table by the (Op 1 end) arrow in Row No 11. OR-gate 24 is disabled and the r signal at its output switches to a binary '0' state. The p, q and r output signals now have values 1, 0, 0 respectively as shown in Row No 12. As has been explained hereinbefore, when all devices connected to the bus have completed their respective first operations, the wired-OR logic connections between the r lines from the devices and the R bus line switch the R bus signal to a binary '0' state indicating to all devices that their respective second operations in the sequence may now be started.

Since the inverse of the R bus signal is applied to AND-gate 12 of logic block 2, as shown in Row No 13 of the state table, AND-gate 12 and OR-gate 14 are enabled and the q signal at the output of OR-gate 14 and thus logic block 2 is switched to a binary '1', state. This signal is applied through wired-OR logic L2 to the Q bus line which immediately reflects this change in state, and is further supplied to the associated device to cause it to start performing its own operation 2. The (Op. 2 in progress) input to OR-gate 4 is raised and the p output from logic block 1 maintained as a binary '1' as shown in Row No 18 of the state table.

Upon completion of the second operation, the (Op. 2 in progress) signal level applied to AND-gate 4 drops as indicated in Row No 20 by the (Op 2 end) arrow, and the p signal from logic block 1 switches to its binary '0' level. The p, q and r values from the device are now 0, 1, 0 respectively as shown in Row No 21. When all devices connected to the bus have completed their respective second operations, the wired-OR logic connections between the p lines from the devices and the P bus line switch the P bus line signal to a binary '0' state indicating to all devices that their respective third operations in the sequence may now be started.

Since the inverse of the P bus line signal is applied as input to AND-gate 22 already receiving the true Q bus line signal, this gate and OR-gate 24 are enabled and the r signal at the output of logic block 3 is switched to a binary '1' state. This condition is shown in Row No 24 where the p, q and r signals have the values 0, 1, 1 respectively. This r signal is applied through wired-OR logic L3 to the R bus line which immediately changes state, and is further supplied to the associated device to cause it to start performing operation 3. The (Op. 3 in progress) input to OR-gate 14 is raised as shown in Row No 26 and the q output from logic block 2 is maintained as a binary '1'.

Upon completion of the third operation, the (Op 3 in progress) signal level applied to OR-gate 14 drops as indicated in Row No 29 by the (Op 3 end) arrow, and the q signal from logic block 2 switches to its binary '0' level as a consequence. The p, q and r values from the device are now 0, 0, 1 respectively as shown in Row No 30. When all devices have completed their respective third operations, the wired-OR logic connections between the q lines from all the devices and the Q bus line switch the Q bus line signal to a binary '0' state. If by this time 'START' signal has reverted to binary '0' the sequence of operations stops, at this point. If, on the other hand, the sequence contains more than three operations the 'START' signal will have been left at binary '1', and the effect of Q switching to binary '0' will then be to enable gates 2 and 4 once again, so switching p to binary '1'.

The implementation shown and described has been deliberately simplified for purposes of illustration, and it must be understood that alternative implementations are possible. Two points concerning the implementation shown should be mentioned. The first is that race conditions exist at the inputs to gates 4, 14 and 24. In the case of gate 24 the race condition can be seen by comparing rows 5 and 8 in FIG. 3. To maintain correct operation the circuit must be so designed that the 'Op. 1 in progress' signal switches to binary '1' before the output of gate 23 switches to binary '0'. Corresponding requirements exist in logic blocks LB1 and LB2. There are several conventional ways of meeting these requirements which will be well-known to those skilled in the art.

The second point concerns transmission-line effects that can take place on the bus lines. If two or more devices are applying a binary '1' to the line, and one switches to binary '0' a spurious pulse will appear on the line which can cause devices to misinterpret the state of the line as binary '0'. The effect can be avoided by the use of integrators and threshold circuits. One integrator followed by a threshold circuit is interposed between bus line P and the inputs to inverter 21 and gates 3 and 12; a second identical combination is interposed between bus line Q and the inputs to inverter 1 and gates 13 and 22; and a third between bus line R and the inputs to inverter 11 and gates 2 and 23.

Figure 4:
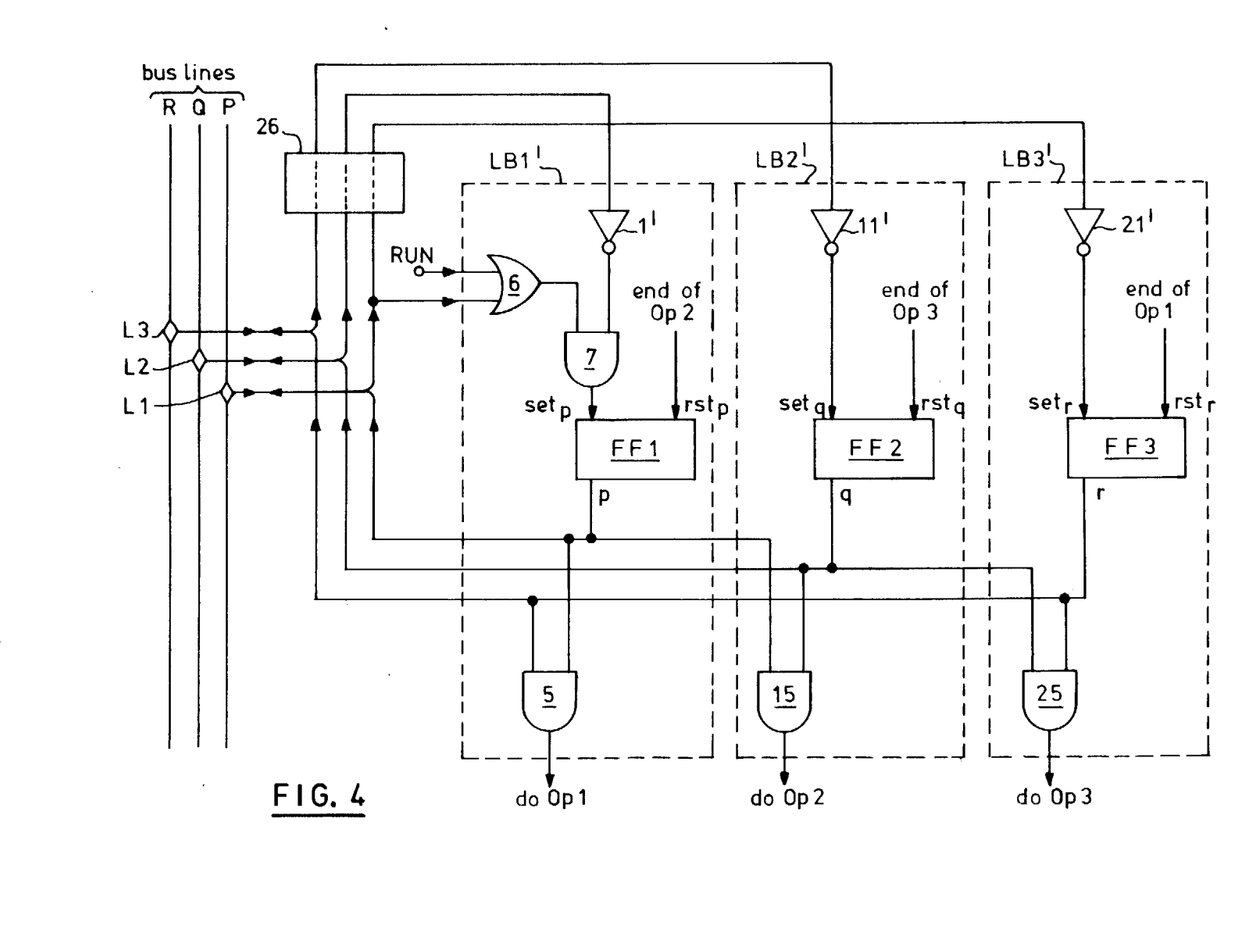
FIG. 4 shows details of an alternative logic arrangement associated with each device and operable to generate the control waveform shown in FIG. 1.

The embodiment shown in FIG. 4 is an alternative control logic arrangement to that described above with reference to FIG. 2 with the advantage of simplicity and the elimination of race conditions. As before, each device can conveniently be regarded as containing three separate logic blocks LB1', LB2' and LB3' corresponding to the blocks LB1, LB2 and LB3 in FIG. 2. The Q bus is connected as input conductor to logic block LB1' where its signal state is inverted by inverter 1' before being applied to the set input of flip-flop FF1. The output from the flip-flop FF1 is the p signal for the device. The R bus is connected as input conductor to logic block LB2' where its signal state is inverted by inverter 11' before being applied to the set input of flip-flop FF2. The output from flip-flop FF2 is the q signal for the device. The P bus is connected as input conductor to logic block LB3' where its signal state is inverted by inverter 21' before being applied to the set input of flip-flop FF3. The output from flip-flop FF3 is the r signal for the device.

Since Operation 1 is commenced immediately, the p signal is generated by the device, and flip-flop FF3 is reset by a signal (End of Op 1) supplied to the reset terminal of flip-flop FF3 at the end of operation 1, the output signal from AND-gate 5, to which the p and r signals are supplied, signals the start and duration of Operation 1. Similarly since flip-flop FF2 is reset by a signal (End of Op 3) supplied to its reset terminal at the end of operation 3, the start and duration of Operation 2 is signalled by the output from AND-gate 15 to which are supplied the p and q signals. Also since flip-flop FF3 is reset by a signal (END of Op 1) supplied to its reset input the start and duration of Operation 3 is signalled by the output from AND-gate 25 to which are supplied the q and r signals.

In addition to the P, Q and R inputs two further input lines are supplied to those logic blocks of the device which may be required to start the sequence of operations. In the embodiment described, logic block LB1' includes the additional start logic of OR-gate 6 and AND-gate 7. One of the inputs to OR-gate 6 is the RUN line to which a signal is applied to force a start should its associated device be the one selected to commence the sequence of operations. The other input is the p signal which ensures that the device commences its sequence of operations in the event that another device connected to the bus has forced a start. As before with the control logic described with reference to FIG. 2, integration and threshold circuits 26 are provided between the bus lines P, Q and R and the inputs to the devices.

Figure 5:
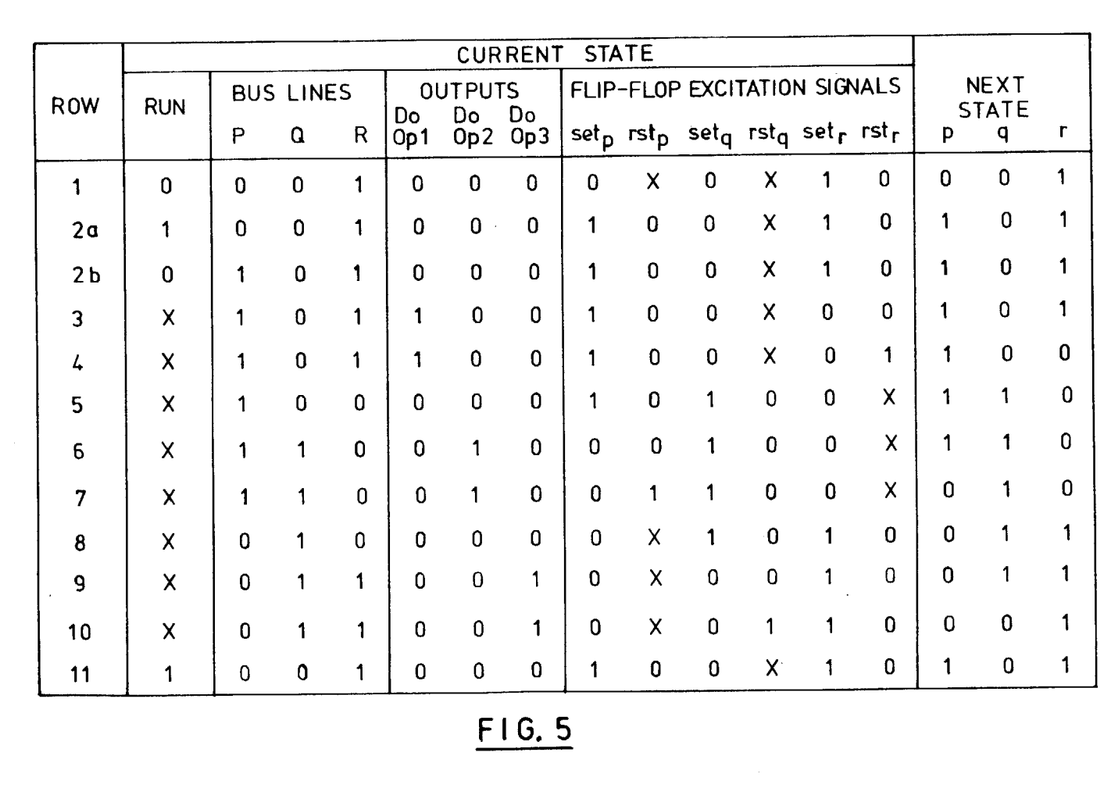
FIG. 5 is a state table for the synchronizing logic shown in FIG. 4.

The operation of the control logic shown in FIG. 4 is set out in the logic state table shown in FIG. 5. In this figure the RUN line signal and the changing signal binary values on the bus lines P, Q and R are shown to the left of the table. The outputs from AND-gates 5, 15, 25 indicating which operation of the sequence is currently in progress are shown as Outputs Do Op 1, Do Op 2, Do Op 3 respectively. The input excitation signals to the three flip-flops FF1, FF2, FF3 are shown as set p, rst p, set q, rst q, set r, rst r respectively. These four sets of signals define the current operating state of the control logic of the device and are grouped together accordingly. The p, q, r outputs from the flip-flop FF1, FF2, FF3 represent the next state of the control logic and is shown in the right of the table. In the table X stands for the 'don't care' state.

Row 1 shows the initial stable state of the control logic with no device on the bus performing an operation, that is with P, Q and R signal values 0, 0, 1 respectively. Applying a START signal by raising the RUN input to OR-gate 6 results in AND-gate 7 being enabled and flip-flop FF1 being set so that its output, the p signal, is switched to a binary '1' state. This signal is applied through wired-OR logic L1 to the P bus line which changes its state to signal to all other devices to start operation 1. The p signal from FF1 and the r signal from FF3 enable AND-gate 5 generating the Do Op 1 signal for the associated device. The signal levels in this case where the sequence of operations of a device is started by a START signal applied to the RUN input of the device itself are shown in row 2a.

Where the sequence is started by another device connected to the bus, then flip-flop FF1 is set instead by the p signal produced by the other device through bus line P, OR-gate 6 and AND-gate 7. The signal levels in this alternative start procedure are shown in row 2b. Row 3 represents the stable state of the logic while Operation 1 is in progress with bus lines P, Q and R with signal values 1, 0, 1 respectively. This condition prevails until the first operation is completed.

The End of operation 1 is signalled by an End of Op 1 signal applied from the device to the reset terminal of flip-flop FF3. Row 4 represents this unstable state with p, q and r signals having the values 1, 0, 0, and therefore the output of gate 5 being restored to 0. As has been explained herein before, it is not until all devices connected to the bus have completed their respective first operation that the R bus line signal switches from binary 1 to binary 0. When this occurs, the binary '0' on the R bus line, inverted by inverter 11', immediately sets flip-flop FF2 so that its output, the q signal, is switched to a binary '1' state and this, in combination with the p=1 signal, enables gate 15 whose output causes Operation 2 to start. This condition is shown in Row 5 with the P, Q and R signal values 1, 0, 0 respectively. The signal from the device is applied through wired-OR logic L2 to change the Q bus to a binary '1'. The stable state with Operation 2 in progress is shown in Row 6 with P, Q and R signal values 1, 1, 0 respectively.

The end of operation 2 in the device is signalled by an end of Op 2 signal applied from the device to the reset terminal of flip-flop FF1 terminating the p signal output. Row 7 represents this unstable state with the p, q and r signal having the values 0, 1, 0 respectively, and therefore the output of gate 15 being restored to 0. When all devices on the bus line have completed their respective second operation, the P bus line switches from binary '1' to binary '0', so that the bus lines are now in the unstable state shown in row 8. The result of the inversion of the P bus signal by invertor 21', causes flip-flop FF3 to be set, generating an r signal at its output. This, in combination with the q=1 signal, enables gate 25 whose output causes Operation 3 to start.

The r signal applied through wired-OR logic L3 changes the signal level of the R bus to a binary '1' and the bus lines will now be stable as shown in Row 9 with P, Q and R signal values 0, 1, 1 respectively.

The end of operation 3 in the device is signalled by an End of Op 3 signal applied to the reset terminal of flip-flop FF2 terminating the q signal output, and causing the output of gate 25 to be restored to 0. Row 10 represents this unstable state with the p, q and r signals having the values 0, 0, 1 respectively. When all devices on the bus have completed their respective third operation, the Q bus line switches from binary '1' to binary '0', so that the bus lines are now in the unstable state shown in Row 11. The result of the inversion of the Q signal by inverter 1', causes flip-flop FF1 to be set (provided the sequence is to continue and a binary '1' signal is provided on the RUN line before operation 3 is over) generating once again a p signal for the start of Operation 4. If the sequence is to end, the signal on the RUN line must be at binary '0' before Operation 3 finishes. In this case, the circuit does not enter the state shown in row 2a or 2b but switches to the initial state of Row 1 with the P, Q and R values 0, 0, 1 respectively.

In summary, the operation of the control logic of FIG. 4 is as follows:

Initially p, q and r in every device, and therefore P, Q and R, have the values 0, 0, 1 respectively.

1. Whichever device is to start the sequence of operations switches its variable p to 1, causing P to switch to 1. It also starts its first operation.

2. The remaining devices sense P switching to 1; they respond by switching their own p to 1 and starting their first operations.

3. As each device completes its first operation it switches its r to 0. Only when the slowest has done so, will line R switch to 0.

4. All devices respond to R switching to 0 by switching their q to 1 and starting their second operation. When they complete it they switch p to 0. P switching to 0 indicates that the slowest has finished.

5. All devices respond to P switching 0 by switching r to 1 and starting their third operation. When they complete it they switch q to 0, and similarly, Q switching to 0 indicates that the slowest has finished.

6. All devices respond to q switching to 0 by switching p to 1 and starting their fourth operation. On completion they switch r to 0.

The process continues as above until the complete sequence of operations is finished. The operations can be counted in conventional manner either independently in the various devices, or by one of the devices which indicates the count on additional lines in the bus.

If the number of operations in the sequence performed by each device is in integral multiple of 3, then p,q and r will finish at 0, 0, 1 respectively the values at which they started. If not dummy operations can be added at the end of the sequences, to bring the decives back to the correct initial state.

While the invention has been particularly shown and described with reference to preferred embodiments thereof, it will be understood by those skilled in the art that various changes in form and details may be made therein without departing from the spirit and scope of the invention.

I claim:

1. In a multiprocessing system in which a plurality of devices or sub-systems are interconnected by a common bus having multiple bus lines and each device is arranged to perform a sequence of operations which may be the same but may differ from one device to the next and which it is a requirement of the system that during operation thereof the devices shall be kept in step so that no device may start its (i+1)th operation before all devices have finished their ith operation, a synchronizing mechanism comprising in each device:

at least three output control lines coupled to at least three corresponding bus lines so that each bus line is uniquely associated with a different group of said output control lines;

connection means connecting the output control lines to the bus lines to provide a logical OR of the output control lines from each device coupled to corresponding bus lines;

at least three input control lines coupled to corresponding bus lines for carrying the logical ORs of the respective output control lines;

first logic means coupled to the input and output control lines for presenting a first logic value on a first one of the output control lines in a round robin manner in response to signals from the associated device indicating completion of successive operations, the logical OR of the output control lines from all the devices being provided to the first logic means on the input control lines, said first logic means generating a star next (i+1)th operation signal on the output control lines by presenting a second logic value to the next output control line in round robin manner in response to the logic values on the input control lines thereby causing all devices to start their (i+1)th operation.

2. The synchronizing mechanism of claim 1 wherein there are three input control lines and three output control lines in the synchronizinng mechanism of each device, and there are three bus lines, each coupled to corresponding control lines from each device.

3. The synchronizing mechanism of claim 2 wherein two output control lines must have a second logic value in order to cause the devices to start their (i+1)th operaton, said two output control lines being different from the output control line having the first logic value as a result of completion of the ith operation.

4. The synchronizing mechanism of claim 3 wherein completion of sucessive operations causes the first logic means change the logic level of one of the output control lines in a round robin manner such that every third operation results in the same output control line having the first logic value and the other two output control lines having the second logic value.

5. The synchronizing mechanism of claim 4 wherein the first logic means comprises three flip-flop means individually coupled to the three input control lines and having outputs coupled to output control lines different than the input control lines they are coupled to, said flip-flop means being reset by end of operation signals from the device.

6. The synchronizing mechanism of claim 5 wherein each flip-flop means is coupled to an output control line different than the two output control lines used to start the next operation, and completion of the previous operation causes the said output control line to have a first logic value.

* * * * *